United States Patent
Khalak et al.

(10) Patent No.: US 12,465,813 B2
(45) Date of Patent: Nov. 11, 2025

(54) BIOMECHANICAL TRIGGERS FOR IMPROVED RESPONSIVENESS IN GRADE ESTIMATION

(71) Applicant: Apple Inc., Cupertino, CA (US)

(72) Inventors: Asif Khalak, Belmont, CA (US); Adeeti V. Ullal, Emerald Hills, CA (US); Gabriel A. Blanco, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 370 days.

(21) Appl. No.: 17/952,174

(22) Filed: Sep. 23, 2022

(65) Prior Publication Data

US 2023/0390605 A1 Dec. 7, 2023

Related U.S. Application Data

(60) Provisional application No. 63/349,087, filed on Jun. 4, 2022.

(51) Int. Cl.
*A63B 24/00* (2006.01)
*G01C 9/06* (2006.01)
*G01C 22/00* (2006.01)

(52) U.S. Cl.
CPC ............ *A63B 24/0062* (2013.01); *G01C 9/06* (2013.01); *G01C 22/006* (2013.01); *A63B 2220/18* (2013.01); *A63B 2220/836* (2013.01)

(58) Field of Classification Search
None
See application file for complete search history.

(56) References Cited

U.S. PATENT DOCUMENTS

| | | | |
|---|---|---|---|
| 2014/0129189 A1* | 5/2014 | Gyorfi | G01C 22/006 703/2 |
| 2023/0112078 A1* | 4/2023 | Nakata | A61B 5/112 73/510 |
| 2024/0049990 A1* | 2/2024 | Fukushi | A61B 5/1121 |

* cited by examiner

*Primary Examiner* — Lina Cordero
(74) *Attorney, Agent, or Firm* — Fish & Richardson P.C.

(57) ABSTRACT

Embodiments are disclosed for a biomechanical trigger for improved responsiveness in grade estimation. In some embodiments, a method comprises: obtaining, from a wearable device worn by a user, cadence data, speed data and elevation data, determining a grade of a surface on which the user is traveling based on a ratio of a change in elevation based on the elevation data and a change in speed data; determining that the grade satisfies a first condition indicative of a horizontal speed compensation by the user at a grade onset; determining that the grade satisfies a second condition indicative of a rapid elevation increase or decrease at a grade onset; and confirming that the grade is a valid estimate based on either the first condition or the second condition being satisfied.

9 Claims, 12 Drawing Sheets

BIOMECHANICAL TRIGGERS FOR IMPROVED RESPONSIVENESS IN GRADE ESTIMATION

CROSS-REFERENCE TO RELATED APPLICATION

This application claims priority to U.S. Provisional Patent Application No. 63/349,087, filed Jun. 4, 2022, the entire contents of which are incorporated herein by reference.

TECHNICAL FIELD

This disclosure relates generally to health monitoring and fitness applications.

BACKGROUND

Fitness applications often utilize an estimate of grade (also referred to as "incline") to compute fitness metrics. For example, grade is used to compute running power. Running power is a measure of how much work a runner puts into their run in units of watts. In many wearable devices (e.g., smartwatches, fitness bands), grade is determined as a ratio of elevation change to horizontal speed change. Filters used to remove confounds in elevation data can cause delays in grade estimates, which in turn can cause errors in the fitness metrics that rely on grade estimates, such as running power.

SUMMARY

Embodiments are disclosed for biomechanical triggers for improved responsiveness to grade estimation.

In some embodiments, a method comprises: obtaining, with at least one processor of a wearable device worn by a user, cadence data, speed data and elevation data; estimating, with the at least one processor, a surface grade on which the user is traveling based on a ratio of a change in elevation based on the elevation data and a change in the speed data; determining, with the at least one processor, that the grade satisfies a first condition indicative of a speed compensation by the user at a grade onset; determining, with the at least one processor, that the grade satisfies a second condition indicative of a rapid elevation increase or decrease at the grade onset; and confirming, with the at least one processor, that the grade estimate is a valid estimate based on either the first condition or the second condition being satisfied.

In some embodiments, the first condition is satisfied if the grade is greater than a first threshold and a ratio of an absolute value of a change in cadence over cadence is less than a second threshold and a ratio of a change in horizontal speed over horizontal speed is less than a third threshold.

In some embodiments, the second condition is satisfied if the grade is greater than a first threshold and a ratio of an absolute value of a change in cadence over cadence is less than a second threshold and a vertical component of speed is greater than a third threshold.

In some embodiments, a system comprises: at least one processor; memory storing instructions that when executed by the at least one processor, cause the at least one processor to perform any of the methods recited above.

In some embodiment, a non-transitory, computer-readable storage medium having stored thereon instructions that when executed by the at least one processor, causes the at least one processor to perform any of the methods recited above.

Particular embodiments described herein provide one or more of the following advantages. Independent biomechanical indicators that are uncorrelated to the elevation sensor (e.g., a barometer) and noise in the elevation signal are used to trigger grade estimation, thus reducing variability and lag in running power estimation.

The details of one or more implementations of the subject matter are set forth in the accompanying drawings and the description below. Other features, aspects and advantages of the subject matter will become apparent from the description, the drawings and the claims.

DETAILED DESCRIPTION

A system and method for detecting a potential onset of changes in incline during continuous running is disclosed. The method uses a pattern of recent running speed and running cadence to form grade onset indicators (hereinafter also called "triggers") that are uncorrelated to altitude measurements (based on elevation data), and can be used to corroborate incline measurements even before sufficient evidence of incline is collected to pass a confidence filter used to remove confounds. The triggers indicate recent consistency in running cadence and changes in fractional horizontal speed, in combination with elevation based metrics of excessive vertical speed and raw grade. The biomechanical triggers are context-cues that make it possible to respond to and identify transitions to inclined running from a flat state and more quickly minimize impact on additional variability during flat running.

These improvements to grade responsiveness are important for certain fitness metrics in mobile fitness applications, such as grade-adjusted pace and running power, where the timeliness of feedback based on grade is important to assist in pacing before negative effects occur such as over-exertion. The triggers also improve downstream processing of fitness metrics that can be corrupted by the occurrence of invalid inclined data, such as maximal oxygen uptake (VO2 Max) estimation during running.

Figure 1:
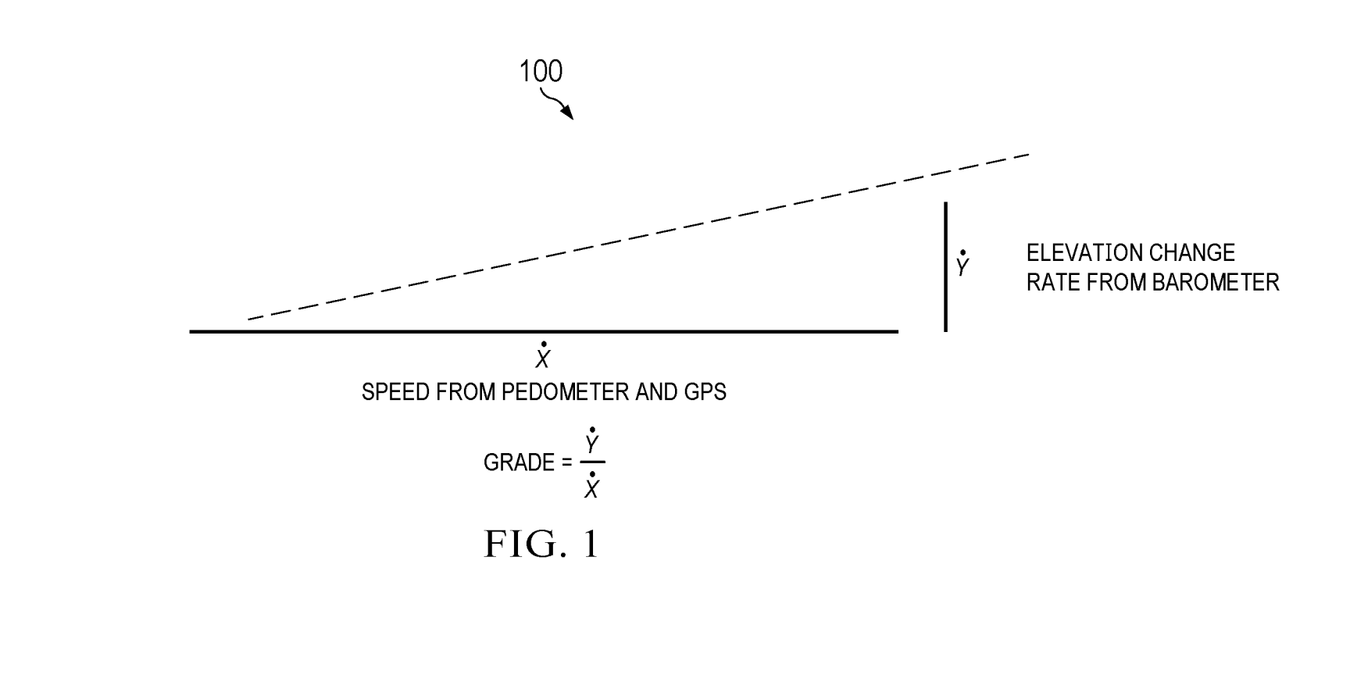
FIG. 1 illustrates calculation of grade (incline).

FIG. 1 illustrates calculation of grade (incline). In many wearable devices, grade is calculated as a ratio of a change in elevation over time and a change of horizontal speed over time, as described in Equation [1].

$$\text{Grade} = \frac{\dot{Y}}{\dot{X}}, \quad [1]$$

where Ẋ is the change in horizontal speed over time, which can be determined by a digital pedometer and a global navigation satellite system (GNSS) receiver, such as a Global Position System (GPS) receiver, and Ẏ is the change in elevation over time, typically determined by elevation data (e.g., from a barometer).

A typical elevation sensor (e.g., a barometer) used in wearable devices to estimate elevation changes has a fast response time, but encounters confounds at fast time scales. These confounds include but are not limited to: variation in elevation change due to arm swing for wrist worn devices; local pressure/temperature variations in the case of a barometer; and other systematic and episodic variations (e.g., variations that occur when the runner is sprinting). Filters that remove these confounds often require confident measures of elevation change. For small and moderate grades at normal running speeds, the calculation of these confidence measures can cause delays that may lead to inaccurate grade estimates, and thus inaccurate calculations of fitness metrics, such as running power.

Figure 2A:
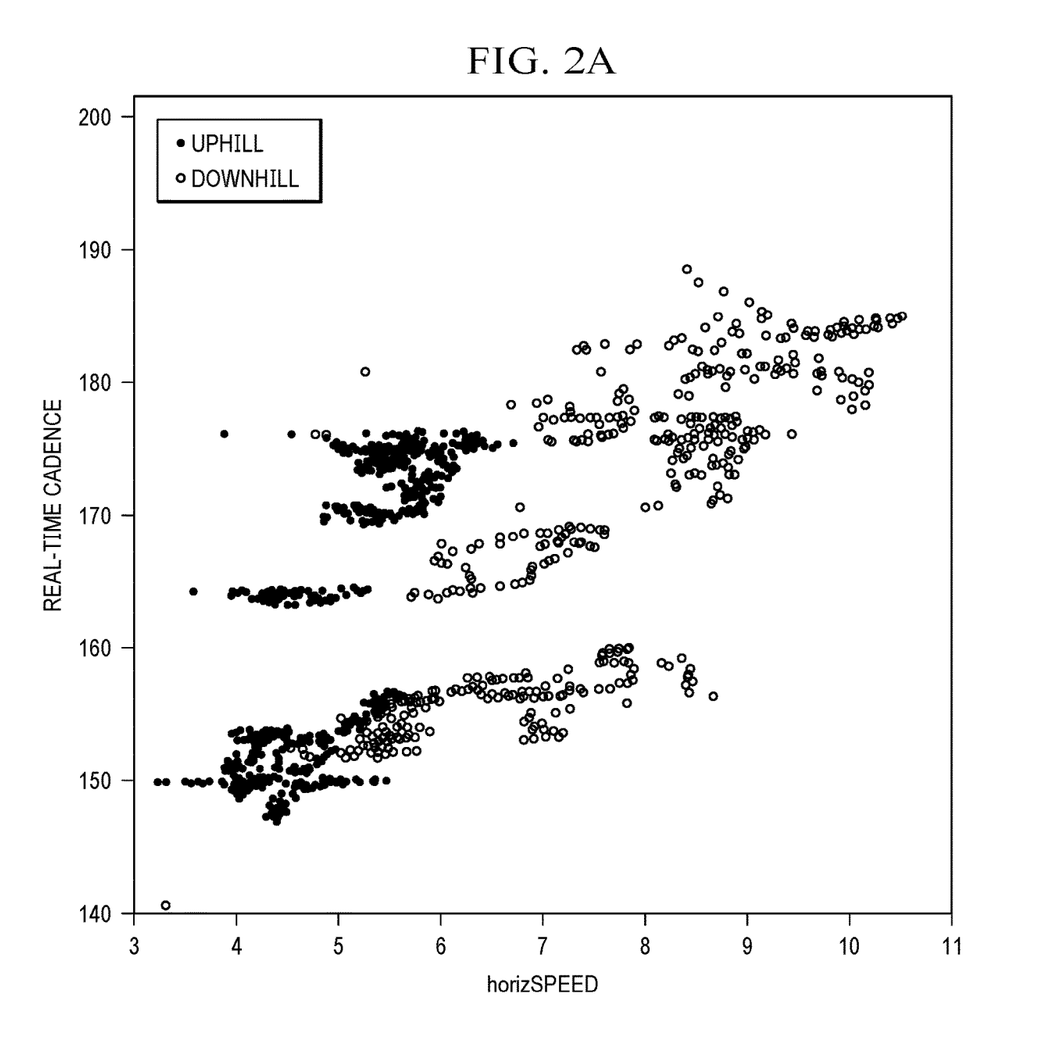
FIGS. 2A and 2B illustrate how running power fractional normalization collapses population variation.
Figure 2B:
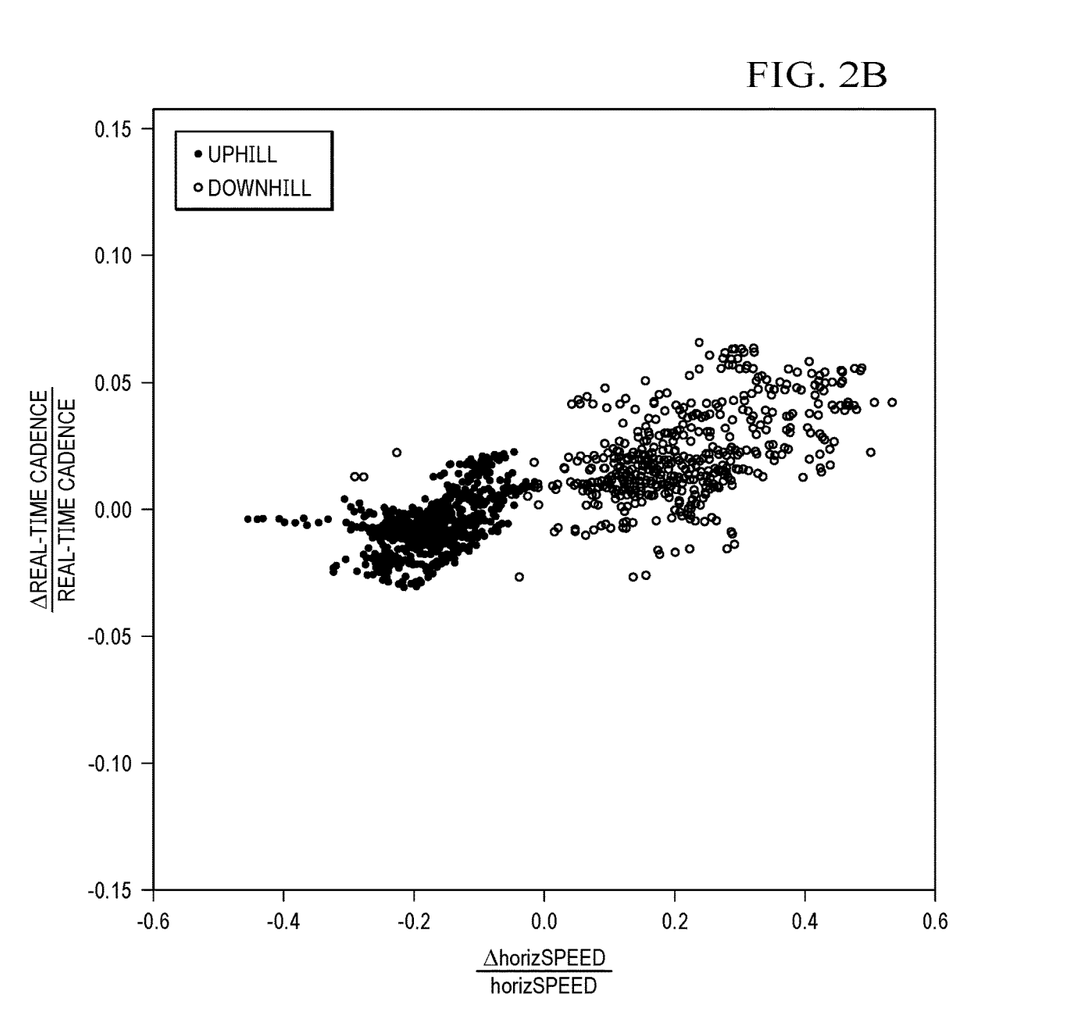

FIGS. 2A and 2B illustrate how running power fractional normalization collapses population variation. More particularly, FIG. 2A shows a cloud of data points for current cadence versus horizontal speed for a population of users. Data points are shown for uphill grades and downhill grades. FIG. 2B shows the data points for a ratio of a change in cadence over cadence versus a ratio of change of horizontal speed to horizontal speed for uphill and downhill grades.

It can be observed from FIGS. 2A and 2B that for a horizontal speed change based criterion, a fractional change substantially normalizes the effect across the population of users, indicating that the criterion is generally applicable to the population of users.

Figure 3A:
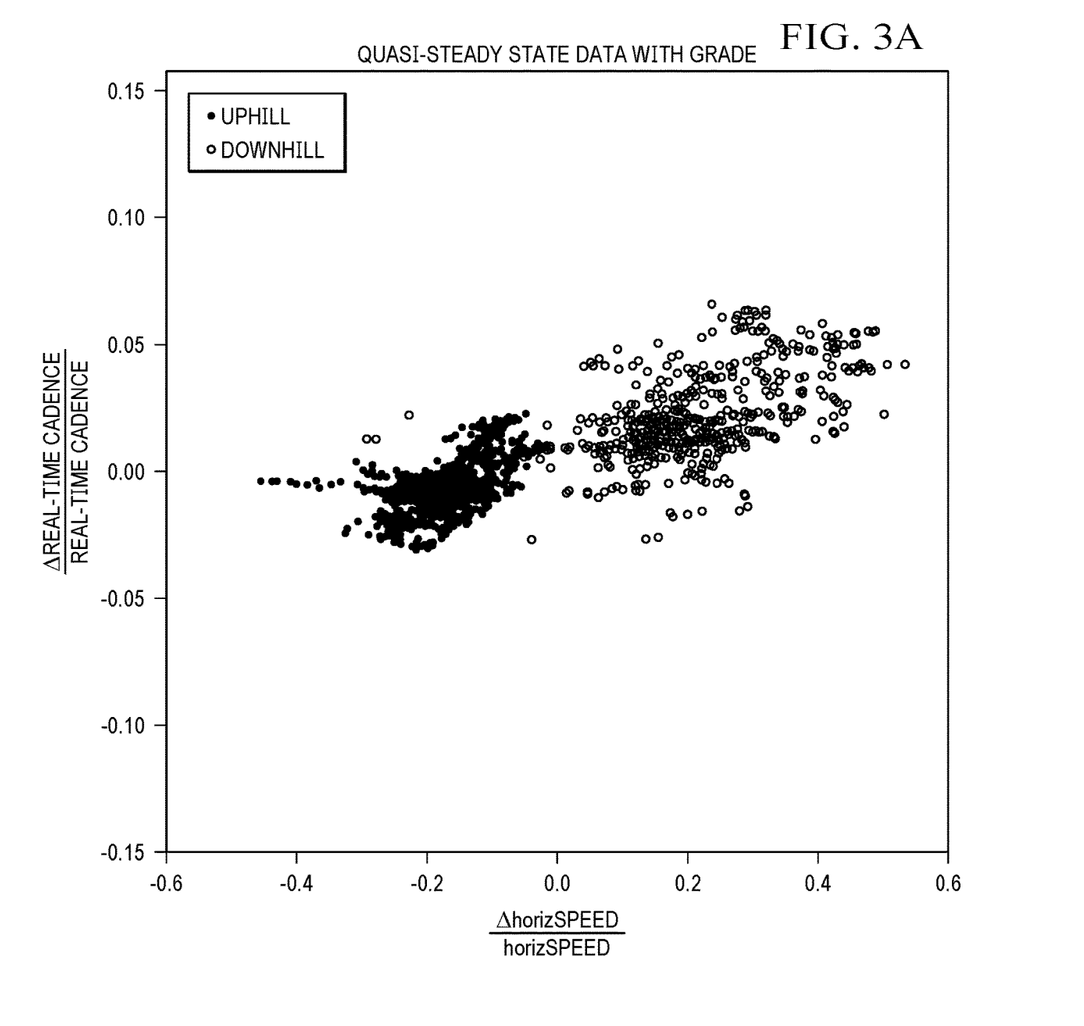
FIGS. 3A and 3B illustrate biomechanical effects on grade versus flat surfaces.
Figure 3B:
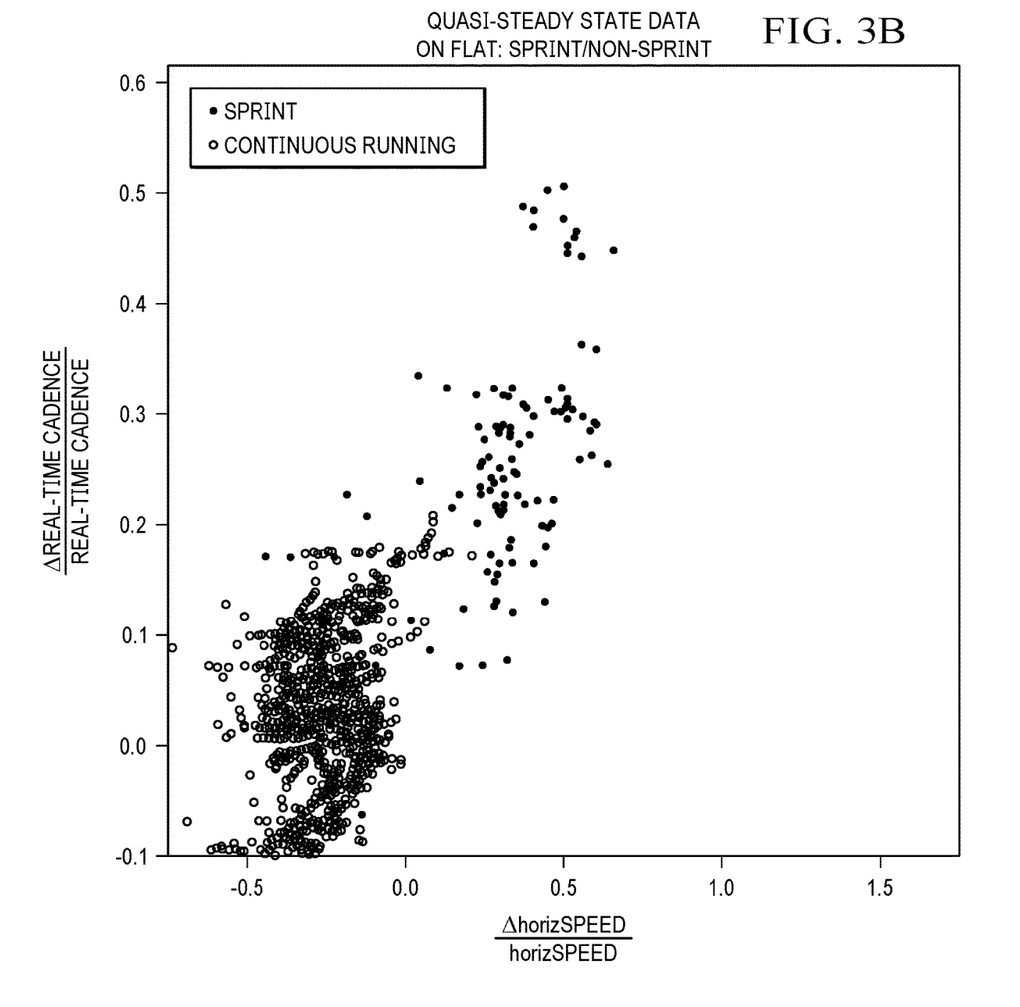

FIGS. 3A and 3B illustrate biomechanical effects on grade versus flat surfaces. Based on scientific literature and testing, users often change their running behavior on grade onset in ways that differ from variation on flat surfaces, such as horizontal speed compensation. This signal provides an independent, biomechanics-based indicator of grade onset that is uncorrelated with the barometer measurements and noise in the barometric pressure signal. It can be observed from FIG. 3A, that a change in cadence over cadence versus a change in horizontal speed over horizontal speed results in a clean separation of uphill and downhill data points, suggesting that these two ratio quantities can distinguish between grade type. Similarly, FIG. 3B shows that these two ratio quantities result in a clean separation of sprint and continuous running data points, suggesting that these ratios can also distinguish between sprint and continuous running.

Based on FIGS. 3A and 3B, a grade onset model is proposed with binary conditions as corroborating evidence of grade. In some embodiments, a horizontal speed compensation trigger model with barometer independent conditions has the form shown in [2]:

$$(\text{grade} > \text{thresh}_f) \& \left( \left| \frac{\Delta cadence}{cadence} \right| < \text{thresh}_c \right) \& \left( \frac{\Delta hspeed}{hspeed} < -\text{thresh}_s \right). \quad [2]$$

In some embodiments, a rapid elevation increase trigger model with barometer independent conditions has the form shown in [3]:

$$(\text{grade} > \text{thresh}_f) \& \left( \left| \frac{\Delta cadence}{cadence} \right| < \text{thresh}_c \right) \& (|vspeed| > \text{thresh}_{vs}). \quad [3]$$

In Equations [2] and [3], grade is calculated based on elevation data and speed data as shown in FIG. 1, vspeed is the vertical speed component (e.g., taken from a GPS velocity) and the thresholds are determined empirically. According to Equation [2] there is confidence of a grade onset if the estimated grade is greater than $\text{thresh}_f$ and the $$\text{ratio} \left| \frac{\Delta cadence}{cadence} \right|$$

is less than $\text{thresh}_c$ and the $$\text{ratio} \frac{\Delta hspeed}{hspeed}$$

is less than $-\text{thresh}_s$. According to Equation [3] there is confidence of a grade onset if the estimated grade is greater than $\text{thresh}_f$ and the $$\text{ratio} \left| \frac{\Delta cadence}{cadence} \right|$$

is less than $\text{thresh}_c$ and |vspeed| is greater than $\text{thresh}_{vs}$.

Figure 4A:
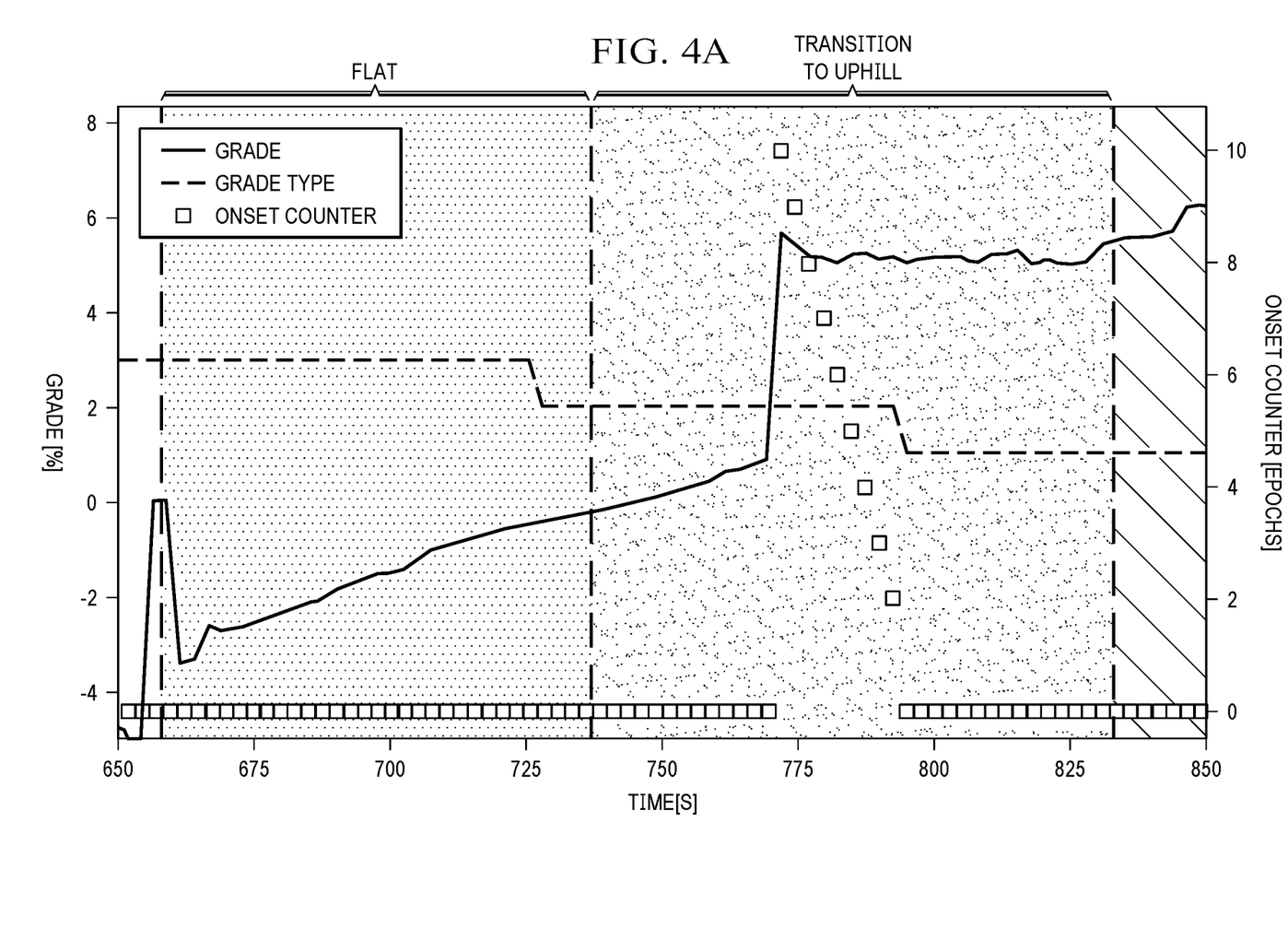
FIGS. 4A-4D illustrate improvements to responsiveness in grade estimation using biomechanical triggers, according to some embodiments.
Figure 4B:
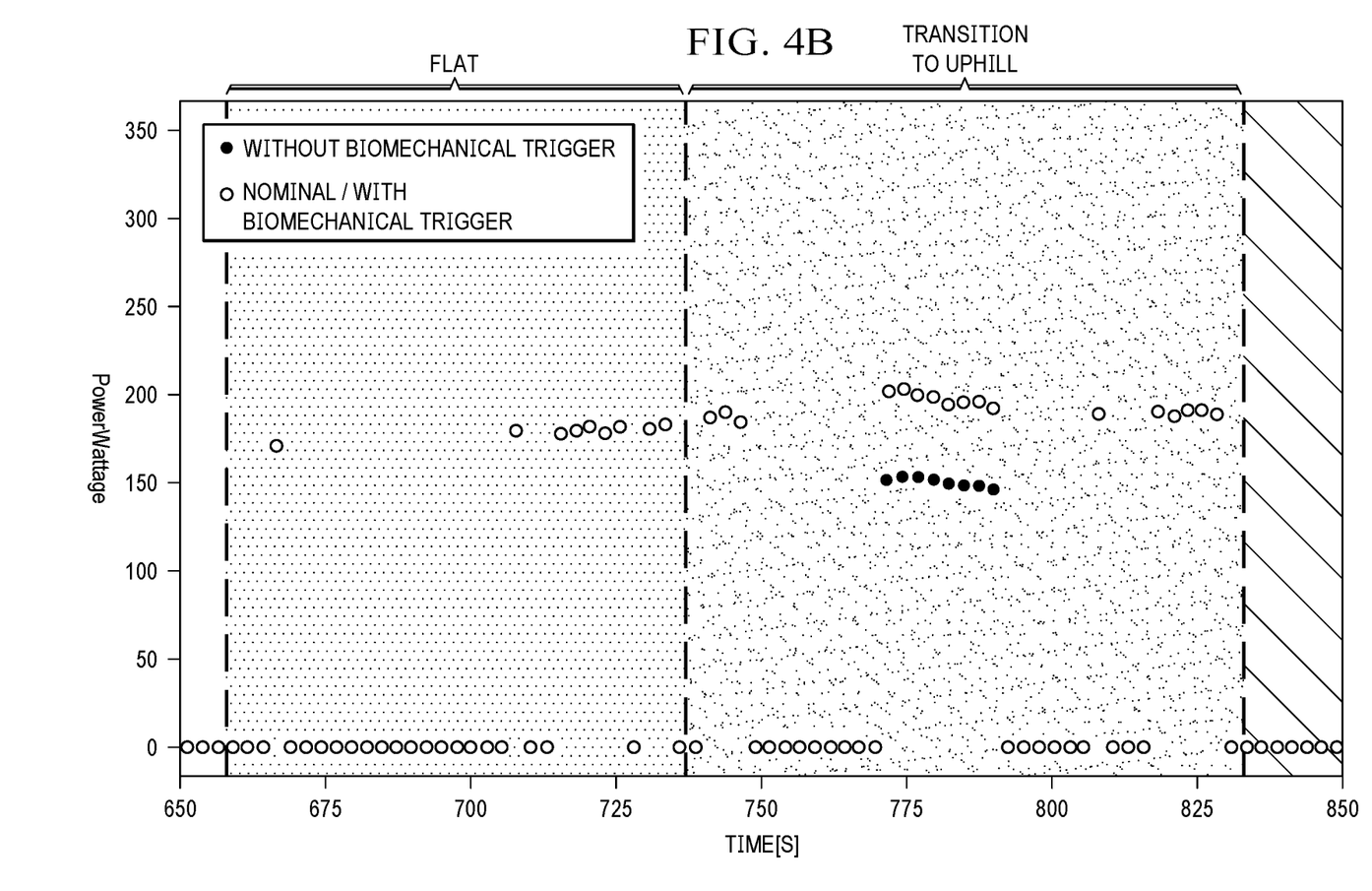
Figure 4C:
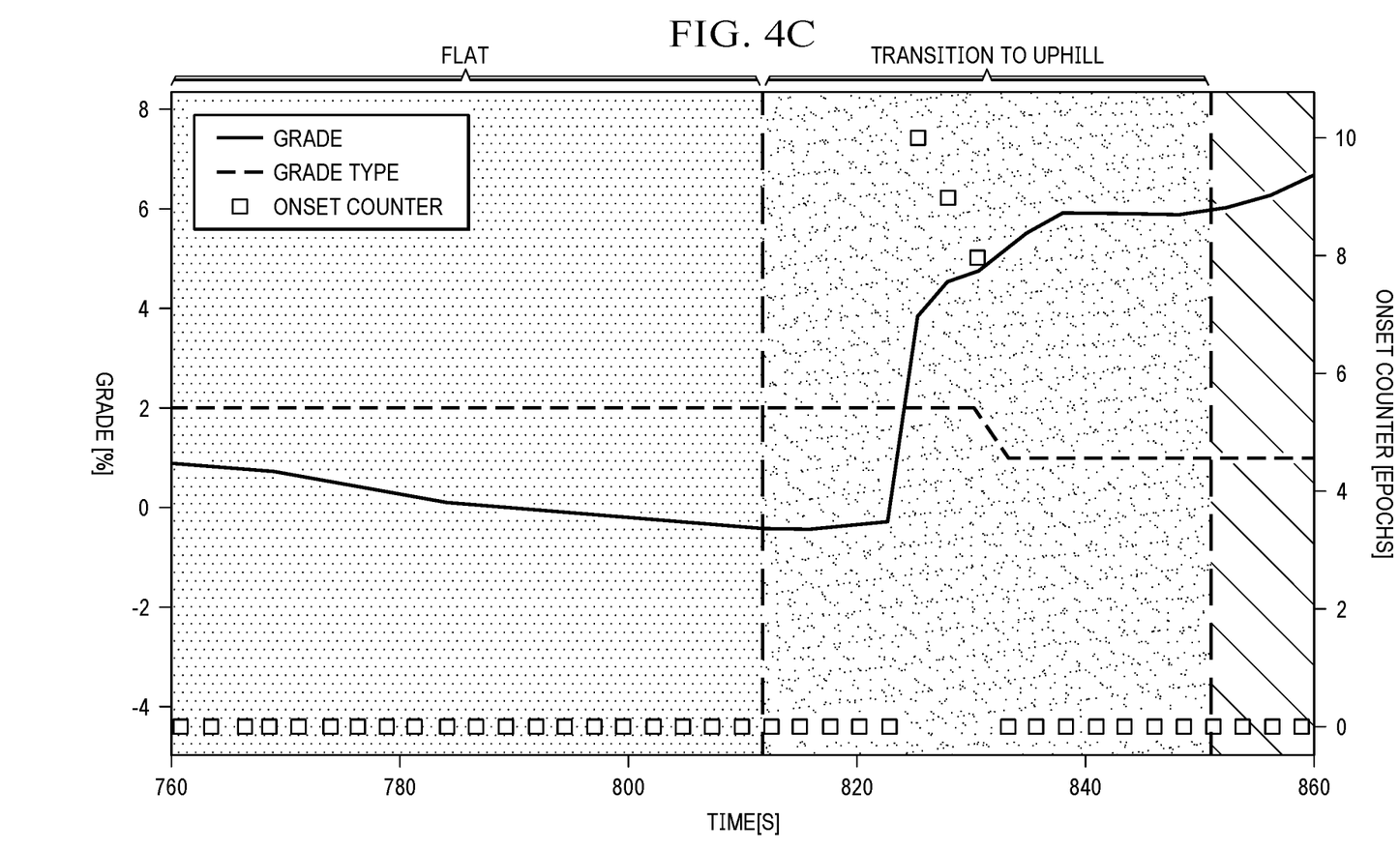

FIGS. 4A and 4C are dual axis graphs illustrating improvements to responsiveness in grade estimation using biomechanical triggers, according to some embodiments. The graphs shown in FIGS. 4A and 4C are divided by vertical dashed lines into flat, transition to uphill and steep uphill regions. The graphs each show a dashed line indicating elevation grade type (EleGradeType), which is a mode indicator for "downhill," "default/flat," and "uphill." Also shown are plots of grade (percentage) and grade onset count (epochs).

FIG. 4B shows running power (watts) versus time for subject 1. Plots are shown for running power with and without grade onset biomechanical triggers shown in Equations [2] and [3]. The plots illustrate how hill onset power fixes an erroneous drop in running power at slow speeds. Note at around t=775 s that the nominal running power without biomechanical onset is at a different level than with the grade onset biomechanical triggers. Before and after this region, the points coincide near 175-200 W. In this region, the running power with biomechanical triggers shows about 200 W, while the running power without biomechanical triggers shows a false dip at ab out 150 W.

Figure 4D:
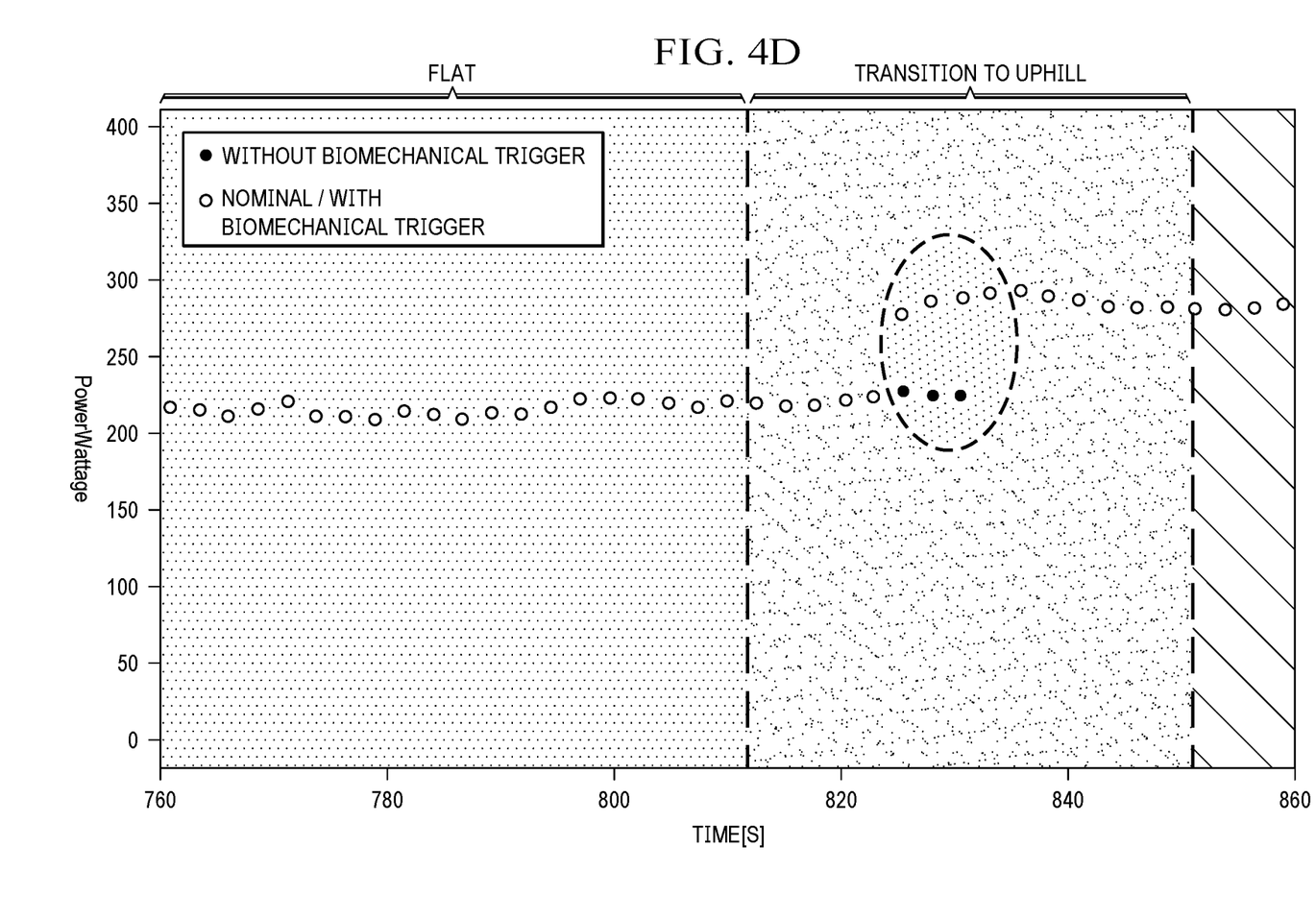

FIG. 4D shows running power (watts) versus time for subject 2. Plots are shown for running power with and without applying the conditions in Equations [2] and [3]. The plots show that at about t=830 s the hill onset power improves response time to grade estimation for faster speeds.

Example Processes

Figure 5:
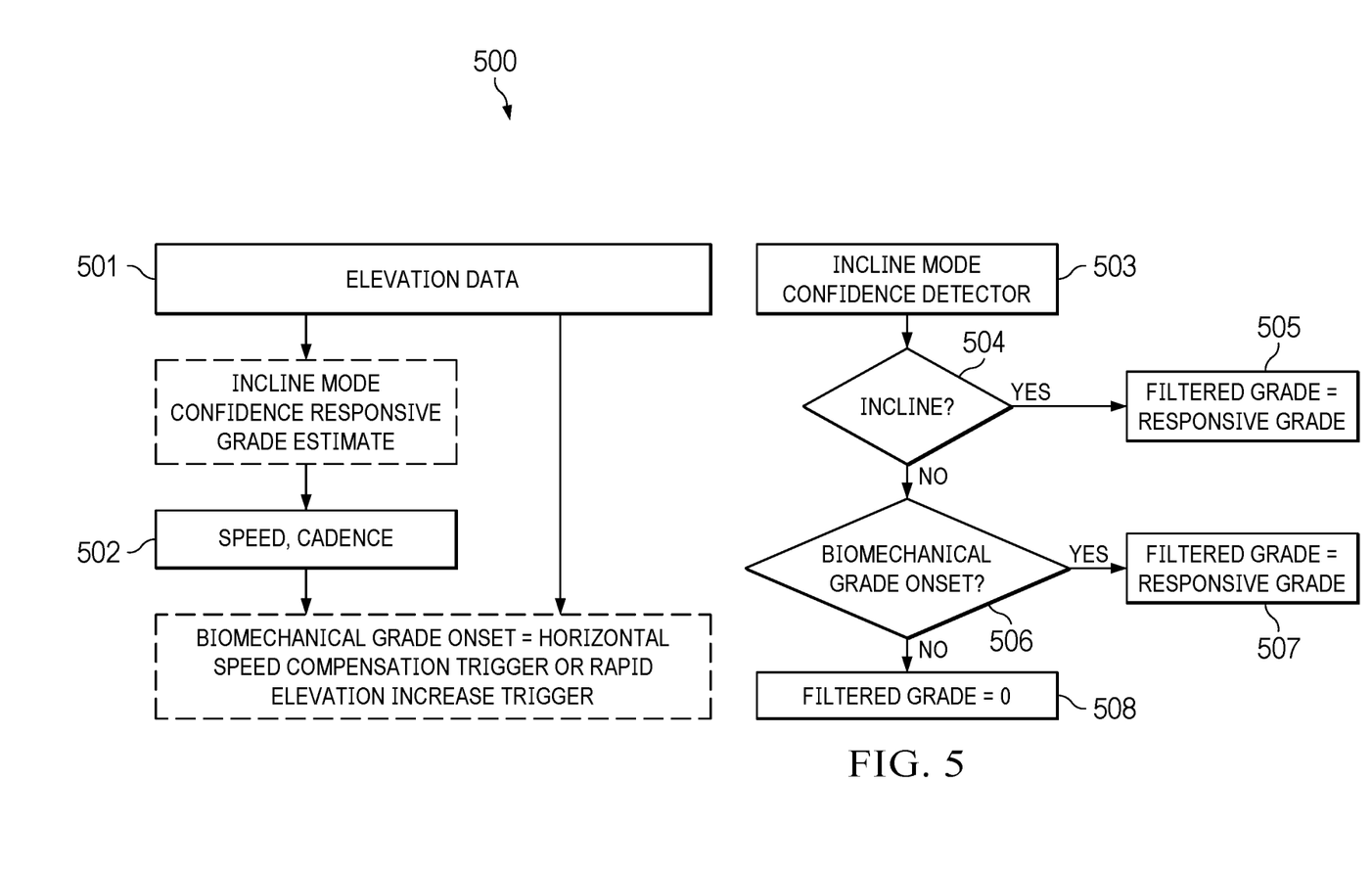
FIG. 5 is a flow diagram of a process for using biomechanical triggers to improve responsiveness of grade estimation, according to some embodiments.

FIG. 5 is a flow diagram of a process 500 for using biomechanical triggers to improve responsiveness of grade estimation, according to some embodiments. Process 500 can be implemented by, for example, using system architecture 700 described in reference to FIG. 7.

Process 500 starts when incline mode confidence detector 503 outputs an incline indicator. If the indicator indicates an incline, then the filtered grade (e.g., filtered elevation to remove confounds) is set equal to the responsive grade, i.e., the filtered grade estimate can be used by downstream applications; otherwise, the biomechanical grade onset is evaluated 506 based on elevation 501 (e.g., barometer-based elevation), speed and cadence 502, i.e., the triggers defined in Equations [2] and [3]. If one or both triggers are met, then the filtered grade is set equal to the responsive grade 507, i.e., the filtered grade estimate can be used by downstream applications; otherwise the filtered grade estimate is set to zero 508, i.e., to indicate no incline because the filtered grade is determined by one or both triggers to be invalid, and thus should not be used by downstream applications.

Figure 6:
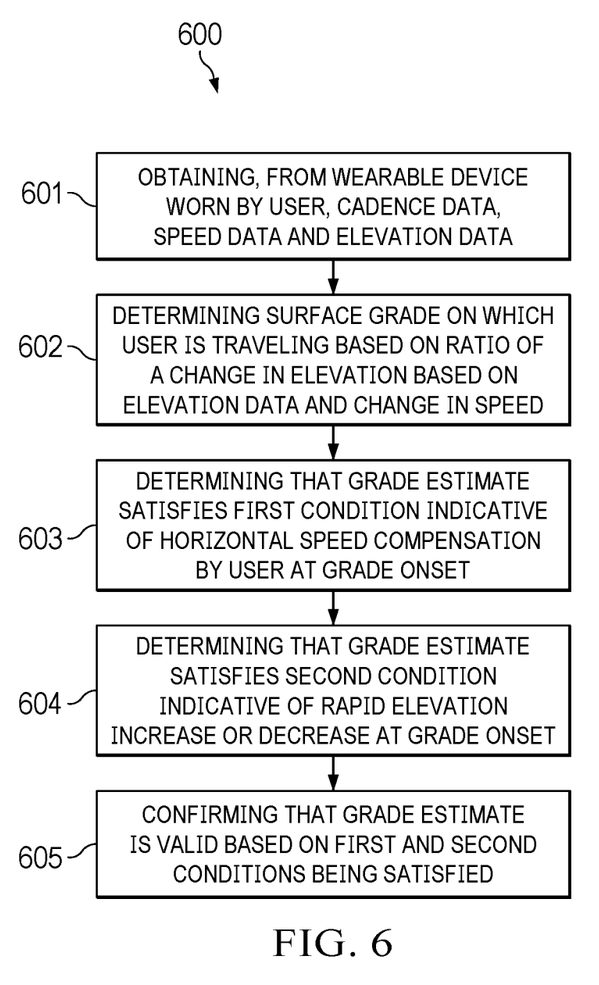
FIG. 6 is a flow diagram of a process for using biomechanical triggers to improve responsiveness of grade estimation, according to some embodiments.

FIG. 6 is a flow diagram of a process for using biomechanical triggers to improve responsiveness of grade estimation, according to some embodiments. Process 600 can be implemented by, for example, using system architecture 700 described in reference to FIG. 7.

In some embodiments, process 600 includes: obtaining, from a wearable device worn by a user, cadence data, speed data and elevation data (601); determining a grade of a surface on which the user is traveling based on a ratio of a change in elevation based on the elevation data and a change in speed data (602); determining that the grade satisfies a first condition indicative of a horizontal speed compensation by the user at a grade onset (603); determining that the grade satisfies a second condition indicative of a rapid elevation increase or decrease at a grade onset (604); and confirming that the grade is a valid estimate based on the first condition or the second condition being satisfied (605). Each of these steps were previously described in reference to FIGS. 1-5.

Exemplary System Architectures

Figure 7:
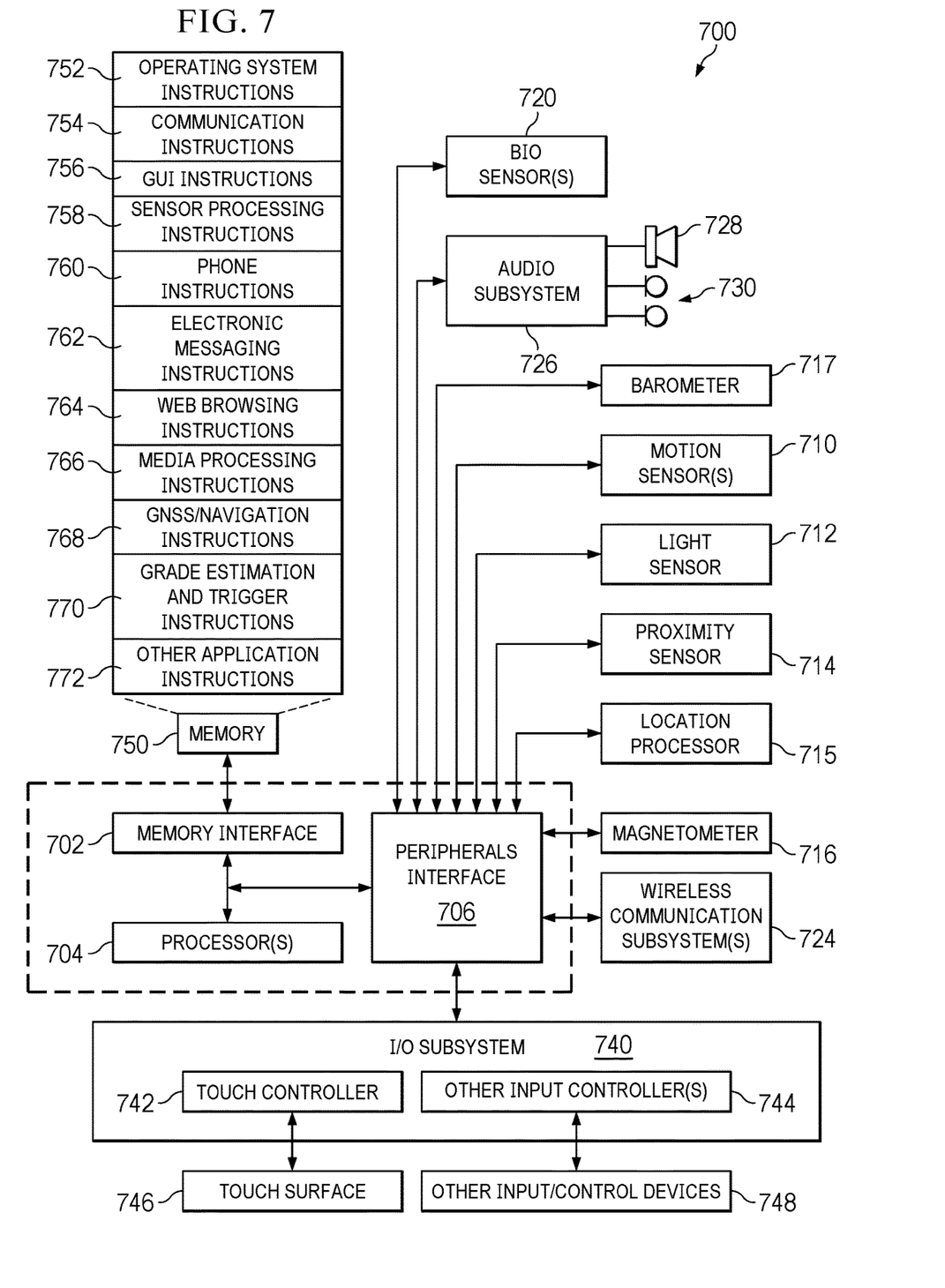
FIG. 7 is example system architecture implementing the features and operations described in reference to FIGS. 1-6.

FIG. 7 illustrates example system architecture 700 implementing the features and operations described in reference to FIGS. 1-6. Architecture 700 can include memory interface 702, one or more hardware data processors, image processors and/or processors 704 and peripherals interface 706. Memory interface 702, one or more processors 704 and/or peripherals interface 706 can be separate components or can be integrated in one or more integrated circuits. System architecture 700 can be included in any wearable device, including but not limited to: a smartwatch, fitness band, etc.

Sensors, devices and subsystems can be coupled to peripherals interface 706 to provide multiple functionalities. For example, one or more motion sensors 710, light sensor 712 and proximity sensor 714 can be coupled to peripherals interface 706 to facilitate motion sensing (e.g., acceleration, rotation rates), lighting and proximity functions of the mobile device. Location processor 715 can be connected to peripherals interface 706 to provide geo-positioning. In some implementations, location processor 715 can be a GNSS receiver, such as the Global Positioning System (GPS) receiver. Electronic magnetometer 716 (e.g., an integrated circuit chip) can also be connected to peripherals interface 706 to provide data that can be used to determine the direction of magnetic North. Electronic magnetometer 716 can provide data to an electronic compass application. Motion sensor(s) 710 can include one or more accelerometers and/or gyros configured to determine change of speed and direction of movement. Barometer 717 can be configured to measure atmospheric pressure, which can be used to determine altitude. Biosensors 720 can include a heart rate sensor, such as a photoplethysmography (PPG) sensor.

Communication functions can be facilitated through wireless communication subsystems 724, which can include radio frequency (RF) receivers and transmitters (or transceivers) and/or optical (e.g., infrared) receivers and transmitters. The specific design and implementation of the communication subsystem 724 can depend on the communication network(s) over which a mobile device is intended to operate. For example, architecture 700 can include communication subsystems 724 designed to operate over a GSM network, a GPRS network, an EDGE network, a Wi-Fi™ network and a Bluetooth™ network. In particular, the wireless communication subsystems 724 can include hosting protocols, such that the mobile device can be configured as a base station for other wireless devices.

Audio subsystem 726 can be coupled to a speaker 728 and a microphone 730 to facilitate voice-enabled functions, such as voice recognition, voice replication, digital recording and telephony functions. Audio subsystem 726 can be configured to receive voice commands from the user.

I/O subsystem 740 can include touch surface controller 742 and/or other input controller(s) 744. Touch surface controller 742 can be coupled to a touch surface 746. Touch surface 746 and touch surface controller 742 can, for example, detect contact and movement or break thereof using any of a plurality of touch sensitivity technologies, including but not limited to capacitive, resistive, infrared and surface acoustic wave technologies, as well as other proximity sensor arrays or other elements for determining one or more points of contact with touch surface 746. Touch surface 746 can include, for example, a touch screen or the digital crown of a smart watch. I/O subsystem 740 can include a haptic engine or device for providing haptic feedback (e.g., vibration) in response to commands from processor 704. In an embodiment, touch surface 746 can be a pressure-sensitive surface.

Other input controller(s) 744 can be coupled to other input/control devices 748, such as one or more buttons, rocker switches, thumb-wheel, infrared port and USB port. The one or more buttons (not shown) can include an up/down button for volume control of speaker 728 and/or microphone 730. Touch surface 746 or other input/control devices 748 (e.g., a button) can include, or be coupled to, fingerprint identification circuitry for use with a fingerprint authentication application to authenticate a user based on their fingerprint(s).

In one implementation, a pressing of the button for a first duration may disengage a lock of the touch surface 746; and a pressing of the button for a second duration that is longer than the first duration may turn power to the mobile device on or off. The user may be able to customize a functionality of one or more of the buttons. The touch surface 746 can, for example, also be used to implement virtual or soft buttons.

In some implementations, the mobile device can present recorded audio and/or video files, such as MP3, AAC and MPEG files. In some implementations, the mobile device can include the functionality of an MP3 player. Other input/output and control devices can also be used.

Memory interface 702 can be coupled to memory 750. Memory 750 can include high-speed random access memory and/or non-volatile memory, such as one or more magnetic disk storage devices, one or more optical storage devices and/or flash memory (e.g., NAND, NOR). Memory 750 can store operating system 752, such as the iOS operating system developed by Apple Inc. of Cupertino, California. Operating system 752 may include instructions for handling basic system services and for performing hardware dependent tasks. In some implementations, operating system 752 can include a kernel (e.g., UNIX kernel).

Memory 750 may also store communication instructions 754 to facilitate communicating with one or more additional devices, one or more computers and/or one or more servers, such as, for example, instructions for implementing a software stack for wired or wireless communications with other devices, such as a sleep/wake tracking device. Memory 750 may include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GNSS/Location instructions 768 to facilitate generic GNSS and location-related processes and instructions; and instructions 770 that implement the features and processes described in reference to FIGS. 1-6. Memory 750 further includes fitness application instructions 772 for generating fitness metrics, such as running power.

Each of the above identified instructions and applications can correspond to a set of instructions for performing one or more functions described above. These instructions need not be implemented as separate software programs, procedures, or modules. Memory 750 can include additional instructions or fewer instructions. Furthermore, various functions of the mobile device may be implemented in hardware and/or in software, including in one or more signal processing and/or application specific integrated circuits.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A method comprising:
obtaining, with at least one processor of a wearable device worn by a user, cadence data, speed data and elevation data;
determining, with the at least one processor, a grade of a surface on which the user is traveling based on a ratio of a change in elevation based on the elevation data and a change in the speed data;
determining, with the at least one processor, that the grade satisfies a first condition indicative of a horizontal speed compensation by the user at a grade onset;
determining, with the at least one processor, that the grade satisfies a second condition indicative of a rapid elevation increase or decrease at the grade onset;
confirming, with the at least one processor, that the grade is a valid estimate based on either the first condition or the second condition being satisfied; and
determining, with the at least one processor, a fitness metric based on the valid grade estimate.

2. The method of claim 1, wherein the first condition is satisfied if the grade is greater than a first threshold, and a ratio of an absolute value of a change in cadence over cadence is less than a second threshold, and a ratio of a change in horizontal speed over horizontal speed is less than a third threshold.

3. The method of claim 1, wherein the second condition is satisfied if the grade is greater than a first threshold, and a ratio of an absolute value of a change in cadence over cadence is less than a second threshold, and a vertical component of speed is greater than a third threshold.

4. A system comprising:
at least one processor;
memory storing instructions that when executed by the at least one processor, cause the at least one processor to perform operations comprising:
obtaining cadence data, speed data and elevation data from a wearable device worn by a user;
determining a grade of a surface on which the user is traveling based on a ratio of a change in elevation based on the elevation data and a change in the speed data;
determining that the grade satisfies a first condition indicative of a horizontal speed compensation by the user at a grade onset;
determining that the grade satisfies a second condition indicative of a rapid elevation increase or decrease at the grade onset;
confirming that the grade is a valid estimate based on either the first condition or the second condition being satisfied; and
determining a fitness metric based on the valid grade estimate.

5. The system of claim 4, wherein the first condition is satisfied if the grade is greater than a first threshold, and a ratio of an absolute value of a change in cadence over cadence is less than a second threshold, and a ratio of a change in horizontal speed over horizontal speed is less than a third threshold.

6. The system of claim 4, wherein the second condition is satisfied if the grade is greater than a first threshold, and a ratio of an absolute value of a change in cadence over cadence is less than a second threshold, and a vertical component of speed is greater than a third threshold.

7. A non-transitory, computer-readable storage medium having stored thereon instructions that when executed by at least one processor, causes the at least one processor to perform operations comprising:
obtaining cadence data, speed data and elevation data;
determining a grade of a surface on which a user is traveling based on a ratio of a change in elevation based on the elevation data and a change in the speed data;
determining that the grade satisfies a first condition indicative of a horizontal speed compensation by the user at a grade onset;
determining that the grade satisfies a second condition indicative of a rapid elevation increase or decrease at the grade onset;
confirming that the grade is a valid estimate based on either the first condition or the second condition being satisfied; and
determining a fitness metric based on the valid grade estimate.

8. The non-transitory, computer-readable storage medium of claim 7, wherein the first condition is satisfied if the grade is greater than a first threshold, and a ratio of an absolute value of a change in cadence over cadence is less than a second threshold, and a ratio of a change in horizontal speed over horizontal speed is less than a third threshold.

9. The non-transitory, computer-readable storage medium of claim 7, wherein the second condition is satisfied if the grade is greater than a first threshold, and a ratio of an absolute value of a change in cadence over cadence is less than a second threshold, and a vertical component of speed is greater than a third threshold.

\* \* \* \* \*